July 9, 1940.　　　　A. M. STONER　　　　2,207,232
CHUCK
Filed Feb. 16, 1939
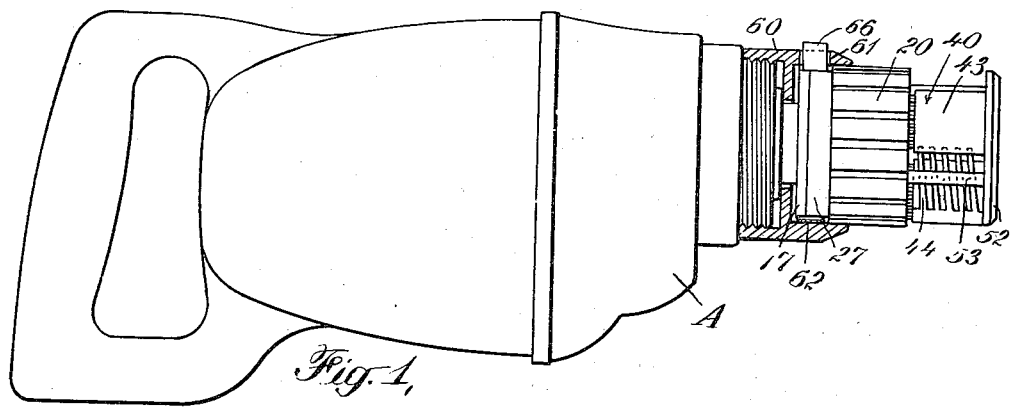
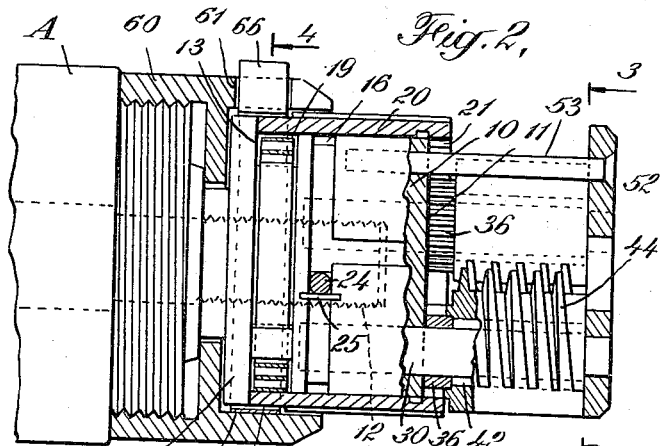
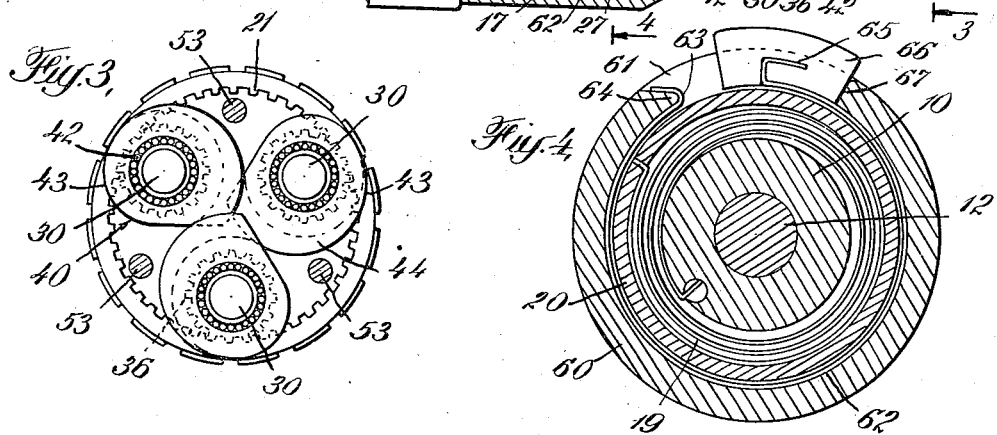
INVENTOR
Arthur Merrick Stoner
BY
Marshall & Hawley
ATTORNEYS Patented July 9, 1940

2,207,232

UNITED STATES PATENT OFFICE 2,207,232

CHUCK

Arthur Merrick Stoner, West Hartford, Conn., assignor to The Jacobs Manufacturing Company, Hartford, Conn., a corporation of Connecticut Application February 16, 1939, Serial No. 256,647

7 Claims. (Cl. 279—33)

This invention relates to improvements in chucks, and particularly to a novel release mechanism for the type of chucks which depend upon the simultaneous movement of a plurality of eccentric gripping jaws for engaging a tool. A chuck of this type is shown in my copending application for patent, Serial No. 218,111, filed July 8, 1938. The movement of the gripping jaws in chucks of this type is effected usually by a relative movement of two rotatable parts with a spring arranged to provide the relative movement in the direction to grip the tool.

In the aforesaid application, a way of releasing the tool is described, which consists of grasping one of the two jaw-actuating parts by the hand while both are rotating, to retard it and produce the relative movement against the action of the spring in the direction required to release the tool. While this method is operative it has two objectionable features,—the necessity of engaging a rapidly moving part by the hand and the possibility of the spring retracting the one of the rotatable parts which is not grasped by the hand to move the jaws back toward their gripping position.

It is the object of the present invention to provide a simple and inexpensive release mechanism which overcomes both of these difficulties.

In the following specification I will describe a mechanism which embodies the present invention and will point out its novel features in appended claims.

Referring to the drawing,

Fig. 1 is a side elevation of a hand electric drill with a chuck thereon which embodies my invention. The latter is shown partly in section;

Fig. 2 is a sectional side elevation of the chuck which is shown in Fig. 1;

Figs. 3 and 4 are sectional end elevations taken respectively on the lines 3—3 and 4—4 of Fig. 2.

A designates the casing of a hand electric drill which forms no part of this invention other than that of being a convenient mechanism for rotating the substantially cylindrical body 10 of the chuck. 11 is the transverse face of this body. 12 is the shaft of the electric drill which is in threaded engagement with the body 10.

13 is an annular groove near the rear end of the body in which is a spiral spring 19. 16 is another annular groove in the body.

20 is a sleeve rotatably supported on the body. At its forward end is an internally toothed flange 21 which overlaps the face 11 of the body. The spring 19 is connected to the body and the sleeve to cause the sleeve to rotate on the body in an anticlockwise direction, as viewed from the front of the chuck. This relative rotation is limited by a pin 24 which extends from the sleeve 20 into the groove 16 and abuts against a transverse key 25.

Three posts 30 equally spaced and at an equal distance from the central axis of the body extend outwardly to a clamping plate 52 which is secured to the body by screws 53.

40 designates the clamping jaws. These have cylindrical bores which surround the posts 30 with interposed roller bearings 42. Each jaw has a body with an eccentric portion 43 and spaced eccentric ribs 44 which overlap when the jaws are rotated. Pinions 36 on the inner ends of the jaws are rotatively mounted on the posts 30 and are in mesh with the gear 21.

The parts thus described are shown in my former application Serial No. 218,111, in which it is pointed out that a pressure of the hand applied to the sleeve 20 while the parts are rotating will move the jaws toward their fully opened position and that when this pressure is released the spring will move the jaws inwardly to grip a tool inserted between them.

A stationary housing 60 projects forwardly from the drill casing A over the rear end of the chuck body 10 and a part of the sleeve 20. This housing may be attached to the drill casing in any suitable manner, or it may be an integral part of the casing. 61 is a slot through the housing 60. 62 is a brake band of spring metal, one end 63 of which is bent to engage an end 64 of the slot, (Fig. 4). Its other end 65 engages a button 66 seated in the slot 61 and projecting through it. The resiliency of the band keeps it normally out of contact with the parts of the chuck which it surrounds and maintains the button 66 against the end 67 of the slot.

The rear end of the sleeve 20 forms a cylindrical surface 27 and the rear end of the body 10 forms an adjacent cylindrical surface 17 of the same diameter. These surfaces are arranged to be within and surrounded by the brake band 62. It is to be noted that the surface 27 is wider than the surface 17, (see Fig. 1), for a purpose which will be pointed out.

While the parts of the chuck are rotating, the rotation of the sleeve 20 may be retarded by a pressure of the thumb on the button 66 which will bring the brake band 62 into engagement with the surface 27 of the sleeve. This will cause a movement of the sleeve 20 in relation to that of the body 10 in a direction to rotate pinions 36 and the gripping jaws 40 in a direction to release any tool which is held between the gripping jaws. At the same time the brake band 62 by engaging the surface 17 will tend to stop the rotation of the body 10 and to bring the chuck to rest. It is obvious that this operation will hold the sleeve and the body of the chuck in whatever position they reach upon coming to rest so that the gripping jaws will be held open and there will be no retractive movement imparted to the body 10 by the spring 19. It is, therefore, possible to insert a tool of maximum diameter between the gripping jaws when the parts are held as thus described by the brake band 62.

The surface 27 of the sleeve is wider than the surface 17 of the body because of the fact that the greater part of the braking effect is applied primarily to the sleeve. It is to be understood that in the usual operation of this device the power of the motor which drives the shaft 12 is first cut off and the brake band applied to the sleeve and the body before these parts have come to rest. A tool which has been engaged between the gripping jaws can be instantly removed and another replaced. Immediately upon release of pressure upon the button 66 the brake band will release itself and the spring 19 will impart the rotation to sleeve 20 relative to body 10 which is required to bring the gripping jaws into engagement with the inserted tool. The chuck is self-locking so that rotation of shaft 12 imparted through the chuck to the tool will cause it to be gripped firmly.

Structural modifications may be made within the scope and spirit of this invention and I intend no limitations other than those imposed by the appended claims.

What I claim is:

1. In combination with a non-rotative housing, a chuck comprising a body rotative in relation to the housing, a sleeve rotatively supported by the body, tool gripping means actuated by a movement of the sleeve on the body and a brake anchored to the housing arranged to engage the body and the sleeve to arrest the movements of the sleeve and the body.

2. In combination with a non-rotative housing, a chuck comprising a body rotative in relation to the housing, a sleeve rotatively supported by the body, tool gripping means actuated by a movement of the sleeve on the body and a brake band surrounding adjacent parts of the sleeve and the body arranged to retard the rotation of the sleeve and to arrest the movements of the sleeve and the body.

3. In combination with a non-rotative housing, a chuck comprising a body rotative in relation to the housing, a sleeve rotatively supported by the body, tool gripping means actuated by a movement of the sleeve on the body, a spring arranged to rotate the sleeve in relation to the body in a direction to move the jaws toward their gripping position, and a brake anchored to the housing arranged to engage the body and the sleeve to cause a relative rotation of the sleeve and body against the action of the spring to release the jaws and to arrest the movements of the sleeve and the body.

4. In combination with a non-rotative housing, a chuck comprising a body rotative in relation to the housing, a sleeve rotatively supported by the body, tool gripping means actuated by a movement of the sleeve on the body and a brake band anchored to the housing surrounding cylindrical parts of the sleeve and of the body of like diameter to retard the rotation of the sleeve and to arrest the movements of the sleeve and the body.

5. In combination with a non-rotative housing, a chuck comprising a body rotative in relation to the housing, a sleeve rotatively supported by the body, tool gripping means actuated by a movement of the sleeve on the body and a brake band anchored to the housing surrounding adjacent cylindrical parts of the sleeve and of the body of like diameter to retard the rotation of the sleeve and to arrest the movements of the sleeve and the body, said cylindrical part of the sleeve being wider than said adjacent part of the body.

6. In combination with a non-rotative housing, a chuck comprising a body rotative in relation to the housing, a sleeve rotatively supported by the body, tool gripping means actuated by a movement of the sleeve on the body, a spring arranged to rotate the sleeve in relation to the body in a direction to move the jaws toward their gripping position, and a brake band anchored to the housing surrounding adjacent cylindrical parts of the sleeve and of the body of like diameter arranged to retard the rotation of the sleeve relative to that of the body against the action of the spring to release the jaws and to arrest the movements of the sleeve and the body.

7. In combination with a non-rotative housing, a chuck comprising a body rotative in relation to the housing, a sleeve rotatively supported by the body, tool gripping means actuated by a movement of the sleeve on the body, a spring arranged to rotate the sleeve in relation to the body in a direction to move the jaws toward their gripping position, and a brake band anchored to the housing surrounding adjacent cylindrical parts of the sleeve and of the body of like diameter arranged to retard the rotation of the sleeve relative to that of the body against the action of the spring to release the jaws and to arrest the movements of the sleeve and the body, said cylindrical part of the sleeve being wider than said adjacent part of the body.

ARTHUR MERRICK STONER.